United States Patent
Pimmel et al.

(10) Patent No.: US 12,206,930 B2
(45) Date of Patent: Jan. 21, 2025

(54) VIDEO EDITING USING TRANSCRIPT TEXT STYLIZATION AND LAYOUT

(71) Applicant: Adobe Inc., San Jose, CA (US)

(72) Inventors: Kim Pascal Pimmel, Seattle, WA (US); Stephen Joseph Diverdi, Berkeley, CA (US); Jiaju MA, Stanford, CA (US); Rubaiat Habib, Seattle, WA (US); Li-Yi Wei, Redwood City, CA (US); Hijung Shin, Natick, MA (US); Deepali Aneja, Seattle, WA (US); John G. Nelson, Seattle, WA (US); Wilmot Li, Seattle, WA (US); Dingzeyu Li, Sammamish, WA (US); Lubomira Assenova Dontcheva, Seattle, WA (US); Joel Richard Brandt, Venice, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/154,412

(22) Filed: Jan. 13, 2023

(65) Prior Publication Data
US 2024/0244287 A1 Jul. 18, 2024

(51) Int. Cl.
*H04N 21/431* (2011.01)
*G06F 3/04812* (2022.01)
*G06F 3/0482* (2013.01)
*H04N 21/4402* (2011.01)

(52) U.S. Cl.
CPC ..... *H04N 21/4312* (2013.01); *G06F 3/04812* (2013.01); *G06F 3/0482* (2013.01); *H04N 21/440236* (2013.01)

(58) Field of Classification Search
None
See application file for complete search history.

(56) References Cited

U.S. PATENT DOCUMENTS

2022/0130427 A1* 4/2022 Allibhai ................. G10L 21/10

OTHER PUBLICATIONS

U.S. Appl. No. 18/346,051, "Script Based Video", of Aneja, D., et al., filed on Jun. 30, 2023.

* cited by examiner

*Primary Examiner* — Omar S Parra
(74) *Attorney, Agent, or Firm* — Shook, Hardy & Bacon L.L.P.

(57) ABSTRACT

Embodiments of the present disclosure provide, a method, a system, and a computer storage media that provide mechanisms for multimedia effect addition and editing support for text-based video editing tools. The method includes generating a user interface (UI) displaying a transcript of an audio track of a video and receiving, via the UI, input identifying selection of a text segment from the transcript. The method also includes in response to receiving, via the UI, input identifying selection of a particular type of text stylization or layout for application to the text segment. The method further includes identifying a video effect corresponding to the particular type of text stylization or layout, applying the video effect to a video segment corresponding to the text segment, and applying the particular type of text stylization or layout to the text segment to visually represent the video effect in the transcript.

20 Claims, 8 Drawing Sheets

VIDEO EDITING USING TRANSCRIPT TEXT STYLIZATION AND LAYOUT

BACKGROUND

Recent years have seen a proliferation in the use of video, which has applications in practically every industry, from film and television to advertising and social media. Businesses and individuals routinely create and share video content in various contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through multiple outlets. Indeed, recent advancements in digital cameras, smartphones, social media, and other technologies have provided many new ways that make it easier for even novices to capture and share a video. With these new ways to capture and share video comes an increasing demand for video editing features.

Conventionally, video editing involves selecting video frames and performing some action on the frames or associated audio. Some common operations include importing, trimming, cropping, rearranging, applying transitions and effects, adjusting the color, adding titles and graphics, exporting, and others. Video editing software, such as ADOBE® PREMIERE® PRO and ADOBE PREMIERE ELEMENTS, typically includes a graphical user interface (GUI) that presents a video timeline representing the video frames in the video and allows the user to select particular frames and the operations to perform on the frames.

SUMMARY

Embodiments of the present disclosure are directed to providing visualizations and mechanisms for performing video edits using transcript interactions. The visualizations and mechanisms include text stylizations or layouts mapped to video effects/effect types. The text stylizations or layouts provide a visualization of a corresponding video effect when a text stylization is applied to a text segment of a transcript. Additional text stylizations or layouts also provide various visualizations of video effects to a corresponding video. An example embodiment provides a transcript using an audio track from a transcribed video. The transcript identifies sentences, words, and timecodes representing when in the video, each word is spoken. A transcript interface presents the transcript and accepts input selecting sentences or words from the transcript. For example, users click and drag across the transcript to select a text segment. The identified boundaries corresponding to the selected text segment are used as boundaries for a selected video segment. Using the selected text segment, a user chooses a text stylization or layout mapped directly to a video effect (e.g., visual effect, audio effect) that is applied to the corresponding video segment. In some implementations, the text stylization or layout is mapped to a video effect type, and upon selection of a text stylization or layout, a video effects panel populates the corresponding video effect options and/or parameters of the video effect type. The selection of one or more video effects is performed from the effects panel and applied to the corresponding video segment. Within the transcript interface, the text stylization or layout is applied to the selected text segment to indicate that the video effect is applied to the corresponding video segment. In some embodiments, the transcript interface applies additional text stylizations or layouts to the selected text segment to differentiate, on the transcript interface, the different video effects being applied to a given video segment.

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the embodiments of the disclosure will become better understood with regard to the following description, appended claims, and accompanying drawings where:

Figure 1A:
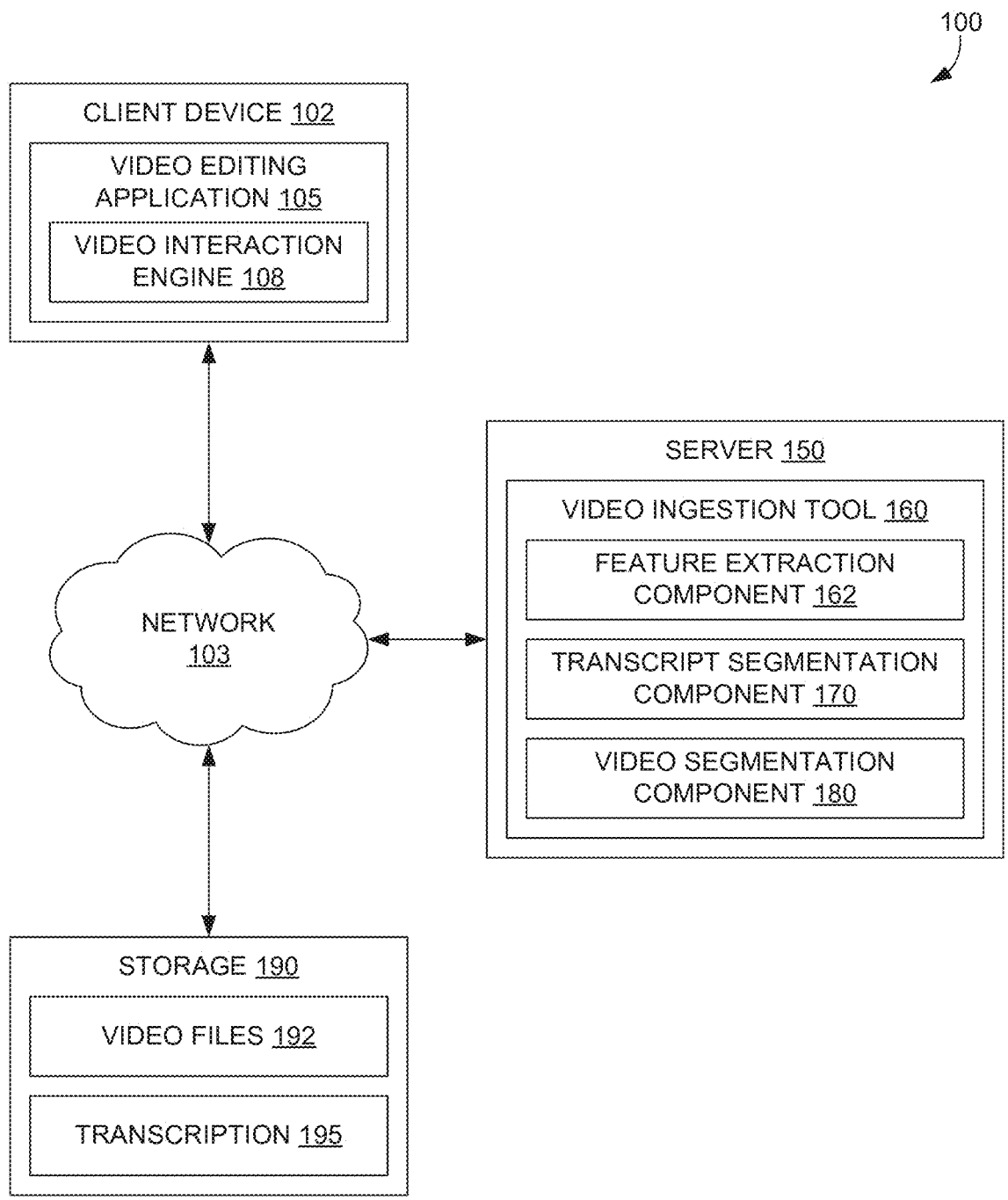
FIGS. 1A-1B are block diagrams of an example computing system for video editing or playback, in accordance with embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

Overview

The present disclosure relates to video editing and, more specifically, to providing mechanisms for adding and editing video effects through transcript interactions. While the present disclosure is not necessarily limited to such applications, various aspects of the disclosure may be appreciated through a discussion of various examples using this context.

Video editing, or nonlinear video editing, involves the process of manipulating and rearranging video shots to create a new work. Typically, video editing software is used to apply video edits to a work. The types of video edits possible include cutting segments (trimming), re-sequencing clips, audio effects, video effects, invisible effects, transitions, special effects, and the like. Conventional video editing interfaces used by the software allow users to select particular video frames through interactions with a video timeline that linearly represents frames on the timeline as a function of time and at positions corresponding to the time when each frame appears in the video.

The video timelines displayed by conventional video editing interfaces provide an area of a video editing application that allows users to arrange video clips and map out the video edits being applied. For instance, a user reorders, trims, and enhances the clips using various video edits from the timelines. Additionally, timelines offer functions and tools such as selection tools, track select tools, ripple edit tools, razor tools, slip tools, pen tools, hand tools, type tools, and the like.

In the past, nonlinear video editing (NLE) has been performed on complex and expensive dedicated machines with dedicated software, but over time video editing software has evolved to be widely available for use on personal computers and even computer tablets and smartphones. The need for video editing software has grown over the last decade as more social media video platforms have become widely available incorporating video. The exponential growth of social media video platforms has resulted in a corresponding increase in content creators who are generating video content, editing that video content, and uploading the video content to social media video platforms and elsewhere.

Limitations on traditional video editing tools remain, however, as the computer programs are expensive and complex, requiring that the user be trained to use generally complex user interfaces. To become adept, users of nonlinear video editing must acquire an expert level of knowledge and training to master the processes and user interfaces for typical video editing systems. The complexity of known nonlinear video editing systems can be intimidating for the general user.

Additionally, these video editing tools often rely on selecting video frames or a corresponding time range. These video editing tools can be inherently slow and fine-grained, resulting in editing workflows that are often considered tedious, challenging, or even beyond the skill level of many users. In other words, timeline-based video editing that requires selecting video frames or time ranges provides an interaction modality with limited flexibility, limiting the efficiency with which users interact with conventional video editing interfaces.

Embodiments of the present disclosure overcome the above, and other problems, by providing mechanisms for adding and/or editing video effects via transcript interactions, and more specifically, via text stylization or layout commands applied to the transcript text. Additionally, or alternatively, applied video effects are visualized in the transcript as a corresponding type of text stylization or layout (e.g., bold, italics, etc.) applied to the corresponding transcript text. Depending on the implementation, different types of text stylizations or layouts are mapped to different types of video effects (e.g., pre-determined and/or configurable). Once a particular text stylization or layout is applied to a selected text segment in the transcript, a video effect associated with that type of text stylization or layout is applied to a video segment corresponding to the selected text segment of the transcript. As such, some embodiments provide an efficient visual representation of applied video effects and their duration in the transcript.

In some embodiments, techniques are disclosed for applying video effects (e.g., visual effects, audio effects) to a video using a mapping between text stylization or layout commands (e.g., apply boldface, italics, underlining, a particular font or size, indenting, highlighting) and a designated video effect (e.g., layering graphics, text pop-out, inserted audio effects, transitions, etc.). Depending on the embodiment, the mapping is predetermined and/or configurable. In operation, a text-based video editor displays a video transcript and interprets a text stylization or layout command applied to a selected text segment of the transcript as a command to apply (or remove) a corresponding video effect to (or from) a video segment corresponding to the selected text segment. In response to receiving a text stylization or layout command, a corresponding video effect is applied to the corresponding video segment, and the transcript is updated to reflect the applied text stylization or layout command (e.g., the selected text segment is stylized in a manner that corresponds to the applied video effect), thereby providing a visual representation of the applied video effect on the transcript.

More specifically, some embodiments map text stylizations or layouts (e.g., bold, italic, font size, headings, strikethrough, underline) to video effect types (e.g., visual effects, audio effects). In an example implementation, a user selects transcript text and applies a mapped text stylization or layout to the selected transcript text, and the applied text stylization or layout visually represents the applied video effect in the transcript. In some implementations, an effect panel displays configurable parameters of an applied video effect associated with a selected text segment. From the panel, one or more video effect parameters are selected for application to the associated video segment.

In some embodiments, the mapping between text stylizations or layouts and video effect types is configurable. For example, a user selects a particular text stylization or layout (e.g., bold, italic, underline, strikethrough, etc.) via a stylization panel and a particular video effect type (e.g., visual effects, audio effects, etc.) and/or video effect via an effects panel. Through the selection, the user can set the configurable mapping to map the selected stylization to the selected video effect type/video effect. As such, the configurable mapping is adjustable to accommodate any number of mappings between different text stylizations or layouts and video effect types/video effects.

In some embodiments, the text stylization or layout applied to a text segment in a transcript is associated with more than one video effect of a video effect type. As such, an applied text stylization or layout can represent multiple video effects applied to a corresponding video segment. For instance, a text segment has an applied boldface mapped to a visual effect type. Upon application of the boldface to the text segment, an effects panel is presented that displays multiple visual effect parameters that can also be applied to the corresponding video segment. From the effects panel, multiple visual effect parameters can be selected for application to the video segment. In some implementations, the effects panel includes one or more user interface elements (e.g., an add effect button) that provides a mechanism for adding multiple video effects to a video segment and associating those video effects with an applied text stylization. In some implementations, the add effect button allows a user to add multiple video effects of an effect type by selecting a video effect, selecting the add effect button, and then selecting an additional video effect.

In some implementations, a transcript interface provides mechanisms for applying more than one text stylization to a text segment, thereby providing mechanisms for applying more than one video effect to a corresponding video segment of the text segment. In an example scenario, a text segment has both boldface and an underlined text stylization applied, where the bolded text stylization visually represents a particular applied video effect, and the underlined text stylization visually represents a different applied video effect. In some implementations, the applied text stylizations or layouts indicate a different applied effect of varying video effect types. For example, in some embodiments, the boldface format indicates an applied visual effect, and the underlined format indicates an applied audio effect.

In some embodiments, the text-based video editing tool provides a tracks panel, including a video track, audio track, and effect tracks for each video effect applied to the video. The video and effect tracks provide visualization of a sequence of still images (e.g., video frames) and an accompanying audio track including one or more audio signals. The effect tracks provide visualizations of video effects applied to the video track and/or the audio track. In some implementations, the effect tracks include adjustable handles. This interaction mechanism allows users to adjust and trim the corresponding video effect by selecting (e.g., by clicking or tapping and dragging along the effect track) an adjustable handle and adjusting the placement of the video effect as represented by the effect track. In some implementations, the tracks panel includes a current time indicator displayed over the tracks to provide an indication of the current time of a video during playback. As such, the current time indicator provides an indication of when a video effect begins and where in the video it is played. In some implementations, the current time indicator in the tracks panel is associated with a cursor caret in the transcript interface. The position of the cursor caret corresponds to the time when a video is being played in regard to the words in the transcript as displayed in the transcript interface.

Thus, the illustrative embodiments provide various improvements over conventional techniques and mechanisms. For example, embodiments interpreting text stylization as commands to apply corresponding video effects provide more efficient interaction mechanisms over prior techniques. These interaction mechanisms allow users to apply video effects using the text stylization commands they are familiar with. Embodiments that support multiple text stylization or layout mappings to multiple video effects provide a more efficient layering and visual representation of multiple video effects. In some embodiments, the visual representation allows multiple text stylizations or layouts to be concurrently represented on a text segment in the transcript (e.g., bold, underline, italics). Furthermore, by representing applied video effects as corresponding text stylizations or layouts, the present techniques provide a more efficient visual representation of applied video effects over prior methods by visualizing the applied video effects in the transcript, while minimizing interruption of the transcript reading flow. As such, various embodiments provide users with a familiar and simplified way to visualize, add, edit, and/or remove video effects by leveraging and redirecting existing muscle memory, mental models, and computer usage patterns.

Referring now to FIG. 1A, a block diagram of an example video editing environment 100 suitable for use in implementing embodiments of the disclosure is shown. Generally, the video editing environment 100 is suitable for video editing or playback and, among other things, facilitates text-based video editing, effect visualization, text-based editing, and/or video playback. The video editing environment 100 includes a client device 102, a server 150, and a storage 190, and they are communicatively coupled via a network 103. For purposes of the present description, it will be assumed that the illustrative embodiments are being implemented as part of a video editing application 105 operating on the client device 102. However, this is only one possible implementation and is not intended to be limiting to the present disclosure. Other implementations in which video editing applications 105 are utilized (e.g., browser, cloud-based) may also be used without departing from the spirit and scope of the present disclosure.

In various embodiments, the client device 102 and/or the server 150 are any kind of computing device, such as computing device 700 described below with reference to FIG. 7. Examples of computing devices include a personal computer (PC), a laptop computer, a mobile or mobile device, a smartphone, a tablet computer, a smartwatch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computing device.

In various implementations, the components of the video editing environment 100 include computer storage media that stores information including data, data structures, computer instructions (e.g., software program instructions, routines, or services), and/or models (e.g., machine learning models) used in some embodiments of the technologies described herein. For example, in some implementations, client device 102, server 150, and/or storage 190 include one or more data stores (or computer data memory). Further, while the client device 102, the server 150, and the storage 190 are each depicted as single components in FIG. 1A, the video editing environment 100 includes more than one client device 102, server 150, and/or storage 190 and implementable using any number of data stores, and/or implemented using cloud storage.

The components of the video editing environment 100 are communicatively coupled via the network 103. In some embodiments, the network 103 includes one or more local area networks (LANs), wide area networks (WANs), and/or other networks. In some implementations, the communication path provided by the network 103 is a point-to-point over public and/or private networks. The communication is capable of occurring over a variety of networks, including private networks, VPN, MPLS circuit, or the Internet, and uses appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

In some embodiments, communication is encrypted. The communication is generally over a network such as the LAN, WAN, telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, W-Fi and WiMAX.

Figure 1B:
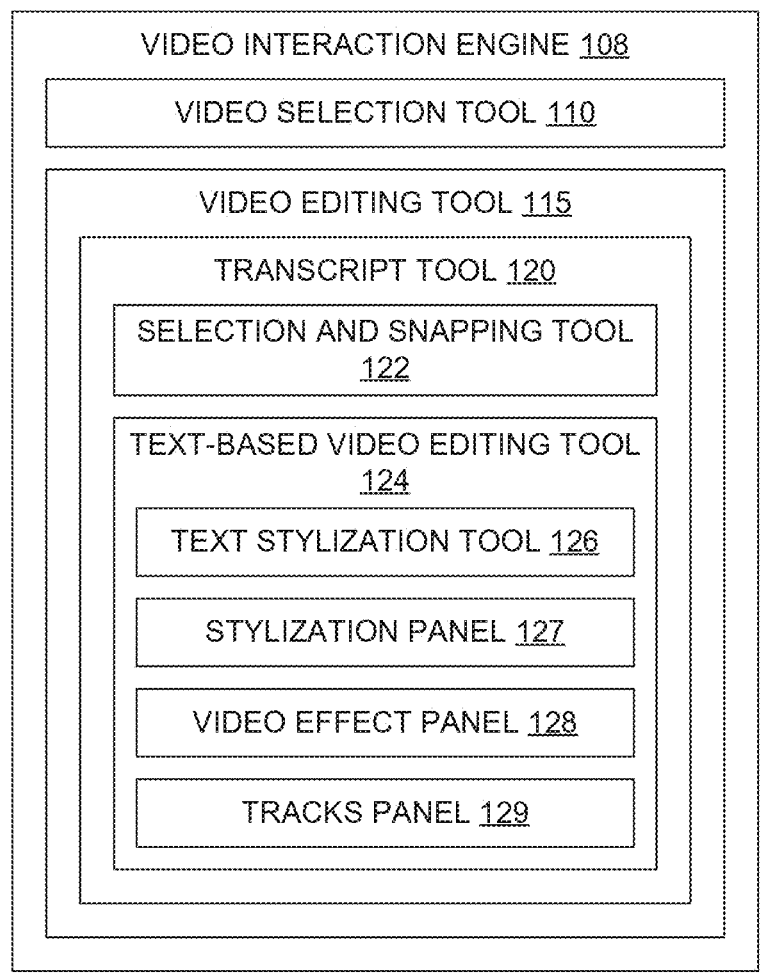

In the example illustrated in FIGS. 1A and 1B, the client device 102 includes the video editing application 105, and the server 150 includes a video ingestion tool 160. In various embodiments, video interaction engine 108, video ingestion tool 160, and/or any of the elements illustrated in FIGS. 1A and 1B are incorporated, or integrated, into an application(s) (e.g., a corresponding application on client device 102 and server 150, respectively), or an add-on(s) or plug-in(s) to an application(s). In some embodiments, the video editing application 105 is any application capable of facilitating video editing or playback, such as a standalone application, a mobile application, a web application, and/or the like. In some implementations, the video editing application 105 includes a web application, for example, that is accessible through a web browser, hosted at least partially server-side, and/or the like. Additionally, or alternatively, the video editing application 105 is a dedicated application operating on the client device 102. In some cases, the video editing application 105 is integrated into an operating system (e.g., as a service). Examples of video editing applications include ADOBE PREMIERE PRO and ADOBE PREMIERE ELEMENTS. Although some embodiments are described with respect to a video editing application 105 and a video interaction engine 108, some embodiments implement aspects of the present techniques in any type of application, such as those involving text-based video editing, transcript processing, visualization, and/or interaction.

In various embodiments, the functionalities described herein are allocated across any number of devices. In some embodiments, the video editing application 105 is hosted at least partially server-side, such that the video interaction engine 108 and the video ingestion tool 160 coordinate (e.g., via the network 103) to perform the functionalities described herein. In some embodiments, the video interaction engine 108 and the video ingestion tool 160 (or some portion thereof) are integrated into a common application executable on a single device (e.g., the client device 102, the server 150). Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

The video ingestion tool 160 is a component of the server 150 configured to extract various features from a video (e.g., transcript) and to generate and store extracted features of that video in the storage 190. The video ingestion tool 160 includes a feature extraction component 162, a transcript segmentation component 170, and a video segmentation component 180.

The feature extraction component 162 is a component of the video ingestion tool 160 configured to detect, extract, or otherwise determine various features (e.g., the transcript 195) from a video. In some embodiments, the feature extraction component 162 processes an audio track of a video to generate a transcript 195 of the audio track. Timecodes can be utilized so that the individual words in the transcript 195 correspond to the audio track. Using this technique, a timecode can be associated with each spoken word in the audio track and associated with each written word in the transcript 195, allowing selected text segments to be associated with corresponding audio and video segments using the timecodes.

A timecode is a video synchronizing standard that is based on a 24-hour clock readout. Each frame of video is assigned a unique timecode value. The timecode is a sequence of numeric codes generated at regular intervals by a timing synchronization system. Timecodes can be used in video production applications which require temporal coordination of elements related to video frames, audio frames, and transcript 195.

Basic timecode standards assume a video framerate of 30 frames-per-second (FPS) or 25 FPS, depending on the country. The National Television Standards Committee (NTSC) video standard, used principally in the United States and some other countries, has a frame rate of 30 FPS, and PAL and SECAM, used mostly in Europe, have a frame rate of 25 FPS. In NTSC, 30 frames equal one second. Video in color or DTV/HDTV actually has a framerate in the United States of 29.97 FPS.

In some embodiments, the feature extraction component 162 tracks the timecode associated with each spoken word in the transcribed text abstracted from the video's audio track. The transcription of each spoken word can be correlated to the audio track timecode and the video track timecode in the video, such that the video corresponding to each spoken word is identifiable in the transcript 195.

The transcript segmentation component 170 is a component of the video ingestion tool 160 configured to segment the transcript 195 to improve readability, understandability, and improve interactions with the transcript 195. The transcript segmentation component 170 is configured to identify sentence segments from the transcript 195, and to generate sentence embeddings for each sentence segment (or access previously generated sentence embeddings). The transcript segmentation component 170 is further configured to break long paragraphs (e.g., longer than a designated length or duration) into multiple smaller paragraphs at sentence boundaries using dynamic programming to minimize a cost function that penalizes candidate segmentations based on divergence from a target paragraph length, that rewards candidate segmentations that group semantically similar sentences into a common paragraph, and/or that penalizes candidate segmentations that include candidate paragraphs with long pauses (e.g., longer than a normalized length or duration).

The video segmentation component 180 is a component of the video ingestion tool 160 configured to identify candidate boundaries for video segments based on sentences boundaries and word boundaries in the transcript 195. The video segmentation component 180 is further configured to identify sentence segments from the transcript 195 and to segment the sentence segments into word segments based on the transcript 195.

In some embodiments, the video segmentation component 180 stores a representation of the video segmentation defined by the boundaries of the word and/or sentence segments (e.g., the video segmentation) using one or more data structures. As such, video ingestion tool 160 and/or video editing application 105 access a video (e.g., one of video files 192), generate a transcript (e.g., transcription 195), and generate and store a representation of one or more segmentation(s) of the video, constituent video segments of the video segmentation(s) (e.g., video files 192), and/or some representation thereof in any suitable storage location, such as the storage 190, the client device 102, the server 150, some combination thereof, and/or other locations.

Provided is an example workflow of the video editing environment 100 as described and illustrated in FIGS. 1A and 1B. To begin, the client device 102 is a desktop, laptop, or mobile device such as a tablet or smartphone, and the video editing application 105 provides one or more user interfaces. In some embodiments, a user accesses a video through the video editing application 105, and/or otherwise uses the video editing application 105 to identify the location where a video is stored (whether local to the client device 102, at some remote location such as the storage 190, or otherwise stored in a location accessible by the network 103). Additionally, or alternatively, a user records a video using video recording capabilities of the client device 102 (or some other device) and/or some application executing at least partially on the device (e.g., ADOBE BEHANCE). In some cases, the video editing application 105 uploads the video (e.g., to some accessible storage 190 for video files 192) or otherwise communicates the location of the video to the server 150, and the video ingestion tool 160 receives or accesses the video and performs one or more ingestion functions on the video including transcribing the audio track of the video into transcribed text files.

During operation, when a new editing and assembly project is initiated, the user's transcribed text files are transferred into the video interaction engine 108. The video editing application 105 includes user interfaces and a set of user tools for editing a video from the video files 192 and the transcript 195. Embodiments of the disclosure use the transcript 195 to select and edit video segments into an assembled video. Using the transcript 195 of the audio track, the user selects text segments and adds video effects onto a visual timeline in a chosen sequence based on the selected text segments. The video editing application 105 allows users to experiment with different video effects during the assembly and editing of a video file. The resulting video may be a rough-cut video in which various video segments are assembled in proper sequence.

As described further on in more detail, the video editing application 105 may perform video edits and apply video effects through the use of a transcript on a transcript interface. The video effects are applied to video segments through the selection of words, phrases, or text segments from the transcript and applying text stylizations or layouts to the word selection. The text stylizations or layouts correspond to video effects/effect types. The video editing application 105 automatically applies and arranges the selected video effect onto the video segment such that when the video is played at the time when the selected word, phrase, or text segment is spoken, the video effect will also appear.

In some embodiments, after applying the intended video effects, the user may export the video to a secondary video editing system (e.g., Avid media composer, ADOBE PREMIER, Final Cut Pro) to provide finishing touches to the rough cut and arrive at a fine-cut version. In some embodiments, the video editing application 105 produces a completed video, without the need for post-processing in a nonlinear editor.

It is noted that FIG. 1A is intended to depict the major representative components of a video editing environment 100. In some embodiments, however, individual components may have greater or lesser complexity than as represented in FIG. 1A, components other than or in addition to those shown in FIG. 1A may be present, and the number, type, and configuration of such components may vary.

Referring now to FIG. 1B, the video interaction engine 108, is a component of the video editing application 105 configured to provide one or more user interfaces with one or more interaction elements that allow a user to interact with a video. For example, techniques used by the video interaction engine 108 applies video effects to a video using various interactions with text segments of a transcript 195 of the video. The video interaction engine 108 includes a video selection tool 110 and a video editing tool 115.

The transcript tool 120 is a component of the video editing tool 115 configured to provide one or more video editing functions performable via the transcript 195. The transcript tool 120 includes a selection and snapping tool 122 and a text-based video editing tool 124.

The selection and snapping tool 122 is a component of the transcript tool 120 configured to accept an input selecting individual sentences, text segments or words from the transcript 195 (e.g., by clicking or tapping and dragging across the transcript) and identifies a video segment with boundaries that snap to the locations of previously determined boundaries (e.g., audio cuts) corresponding to the selected sentences, text segments, and/or words from the transcript 195. The selection and snapping tool 122 determines the corresponding video frames and audio frames of the video segment relating to the transcript 195. For example, a selected text segment within the transcript 195 corresponding to the video segment where the words are being spoken.

In some embodiments, the selection and snapping tool 122 accepts an input selecting an applied effect (e.g., clicking or tapping an effect track, icon, label) displayed on the transcript 195 of a transcript interface and identifies an adjacent effect track with boundaries that snap to the location of previously determined boundaries corresponding to a starting point or ending point of the adjacent effect track.

The text-based video editing tool 124 is a component of the transcript tool 120 configured to accept video effects selections and text segment selections taken from the transcript 195 and perform corresponding video editing operations on corresponding video segments associated with the text segment. The text-based video editing tool 124 includes a text stylization tool 126, a video effects panel 128, and a tracks panel 129

The text stylization tool 126 is a component of the text-based video editing tool 124 configured to apply text stylizations or layouts on selected text segments of a transcript 195 displayed on a transcription interface. Text stylizations or layouts include, but are not limited to, text stylization or layout (e.g., bold, italic, underline, text color, text background color, numeric list, bullet list, indent text, outdent text), font adjustments (e.g., font type, font size), and styles (e.g., headings, style type). The text stylizations or layouts visually represent applied video effects on corresponding video segments. Interaction mechanisms provided by the effect tracks also enable users to explore, discover, and/or modify characteristics (e.g., duration, start point, end point, video effect type) of corresponding video effects through the interactions with the text segments with applied text stylizations or layouts in the transcript 195.

In some embodiments, the text stylization tool 126 is configured to apply text stylizations or layouts that represent multiple video effects of an effect type being applied on a text line of the transcript 195. For example, a selected text segment can have an applied text stylization mapped to a video effect type. The applied text stylization can represent multiple video effects of the mapped video effect type being applied to a video segment corresponding to the selected text segment. As described, during the video editing process, upon selection of a text segment and a text stylization, a determination is made as to the video effect associated with the text stylization. Upon determining the associated video effect, that video effect is applied to a corresponding video segment, and the text stylization is visualized on the text segment. Additional video effects can also be applied to the same text segment and/or portions of the text segment. In these instances, additional visualizations can be applied to indicate that multiple video effects are being applied on a given text line. These visualizations include different text stylizations or layouts for each applied video effect, respectively. These additional text stylizations or layouts can be applied to the text segment, with the beginning of the text segment indicating a starting location of the video effect applied to a corresponding video segment.

In some implementations, the text stylization tool 126 includes a configurable stylization mapping. The configurable stylization mapping is a component of the text stylization tool 126 configured to provide a configurable mapping between text stylizations or layouts and video effects and/or video effect types. The configurable stylization mapping associates each text stylization or layout with one or more video effects and/or video effect types. In an example implementation, the configurable stylization mapping includes a mapping that associates the italics formatting stylization with a particular audio effect. As such, using an italics stylization on a text segment from the given example applies the audio effect to a corresponding video segment of the selected text segment. As a visualization, the selected text segment appears as italicized within the transcript interface. The configurable stylization mapping allows associations between text stylization and video effects. As such, the configurable stylization mapping provides an improved visualization mechanism as the stylizations represent video effects that make sense to the user operating and utilizing various embodiments of the present disclosure. It should be noted that the configurable stylization mapping also includes predefined mappings between text stylizations or layouts and video effects.

In some embodiments, a snapping tool is provided to select and highlight individual words. For instance, when highlighting, a user may use the snapping tool to highlight an entire word automatically. In some instances, snapping may occur to a portion of the word where the snapping tool automatically highlights sections such as half of the word or a quarter of the word. As words are not linear and may appear lengthier in a transcript than what is actually spoken, allowing users to snap to a portion of the word provides a more efficient and fine-tuned approach when applying effects to a transcript. Once selected, the text stylization tool 126 applies a selected text stylization with a corresponding video effect.

In some implementations, the text stylization tool 126 utilizes a stylization panel 127 configured to provide stylization option buttons. The stylization options buttons, when selected, apply text stylizations or layouts corresponding to the particular stylization option button. In some implementations, each stylization button includes a visualization of the stylization type (e.g., bold, italic, underline) and a corresponding visualization of video effect (e.g., visual effect, audio effect) mapped to the particular stylization. For example, in some implementations, the stylization panel 127 includes a bold stylization button and, upon selection, applies bolding to a selected text segment while also applying a corresponding visual effect to a video segment associated with the selected text segment. In this example, the stylization button includes a visualization of a bolding indicator (e.g., a bolded uppercase letter B) and a visualization indicating a particular visual effect (e.g., a camera, camera roll, magic wand).

In some implementations, the text stylization panel 127 includes configurable stylization buttons such that the selection of stylization buttons appearing on the stylization panel 127 are capable of being added, removed, changed, or rearranged to accommodate user preference. For instance, an italics stylization button to the left of a bold stylization button and an underline stylization button. The ordering of those stylization buttons are rearrangeable and/or one or all of those stylization buttons are removeable.

The video effect panel 128 is a component of the text-based video editing tool 124 configured to provide visualizations of video effects associated with a text stylization. In some implementations, the video effects panel 128 provides video effect options that a user utilizes to adjust and edit a particular video effect. For instance, a text pop-up visual effect includes additional video effect options such as text effects, text visualization effects, color, font type, font size, location, and shadowing effect options. In some embodiments, upon selection of a text stylization, the video effects panel 128 provides visualizations of the video effects and video effect options associated with the selected text stylization. For instance, upon detection of a selection of a text stylization (e.g., an underline) for application onto a text segment, the video effects panel 128 provides visualizations of selectable icons and options of the corresponding video effects and video effect options applicable to a video segment associated with the text segment. Upon detection of a different text stylization (e.g., a bolding stylization), the video effect panel 128 changes the visualization of selectable icons and options to correspond to the video effects associated with the different text stylization.

In some implementations, the video effects panel 128 provides an add effects button for adding an additional video effect of the video effect type to a selected text segment. For instance, a text stylization mapped to a visual effect type is applicable to a selected text segment. Using the video effects panel 128, the selection of a particular visual effect occurs. Upon selection of the additive video effects button, another visual effect is selected and adjusted via the video effects panel 128. The result is that the video segment associated with the selected text segment with the applied text stylization includes multiple visual effects. The video effects panel 128 provided by the text-based video editing tool 124 is described in more detail below with respect to FIG. 4.

The tracks panel 129 is a component of the text-based video editing tool 124 configured to display audio/video tracks representing various elements of a video. These elements include, but are not limited to, audio tracks, video tracks, and video effect tracks. In some implementations, the tracks panel 129 includes separate tracks for each applied video effect on a video. For instance, and for illustrative purposes, a transcript 195 is capable of having a text stylization applied to a text segment corresponding to an applied visual effect and another text stylization applied to another text segment corresponding to an applied audio effect. As such, the tracks panel 129 includes a visual effect track visualizing segments of the video with the applied visual effect and an audio effect track visualizing sound waves being played during the corresponding portions of the video.

In some implementations, the tracks panel 129 provides adjustable handles on each end of an effects track. This interaction mechanism allows users to adjust and trim and effect based on the corresponding track in relation to the main video track. The effects track corresponds to a video segment location where the video effect is applied. As such, the adjustments contextually adjust the beginning and/or ending of the video effect as it is applied to a corresponding video segment.

In some embodiments, the tracks panel 129 includes a current time indicator that indicates the position in the track where the corresponding video is currently being played. The current time indicator is represented as a vertical line that segments through each track visualized by the tracks panel 129. In some implementations, a corresponding cursor caret is provided within the transcript that moves along the words of the transcript to provide a visualization as to the current time of the video as it is being played in relation to the transcript. In this way, video effects accurately be applied as the cursor caret provides a clear indication as to the location of a video regarding the transcript. In some implementations, the current time indicator is adjustable by clicking the current time indicator and holding the pointer as it dragged along the track. The corresponding cursor caret moves in accordance with the movement of the current time indicator. Once a location in a video is detected, the cursor caret provides a visualization as starting location of a potential video effect. In some embodiments, adjustable handles on the effects tracks are snapped to the current time indicator to provide an additional adjustment mechanism for the video effects. The tracks panel 129 provided by the text-based video editing tool 124 is described in more detail below with respect to FIG. 4.

It is noted that FIG. 1B is intended to depict the major representative components of an exemplary video interaction engine 108. In some embodiments, however, individual components may have greater or lesser complexity than as represented in FIG. 1B, components other than or in addition to those shown in FIG. 1B may be present, and the number, type, and configuration of such components may vary.

Figure 2:
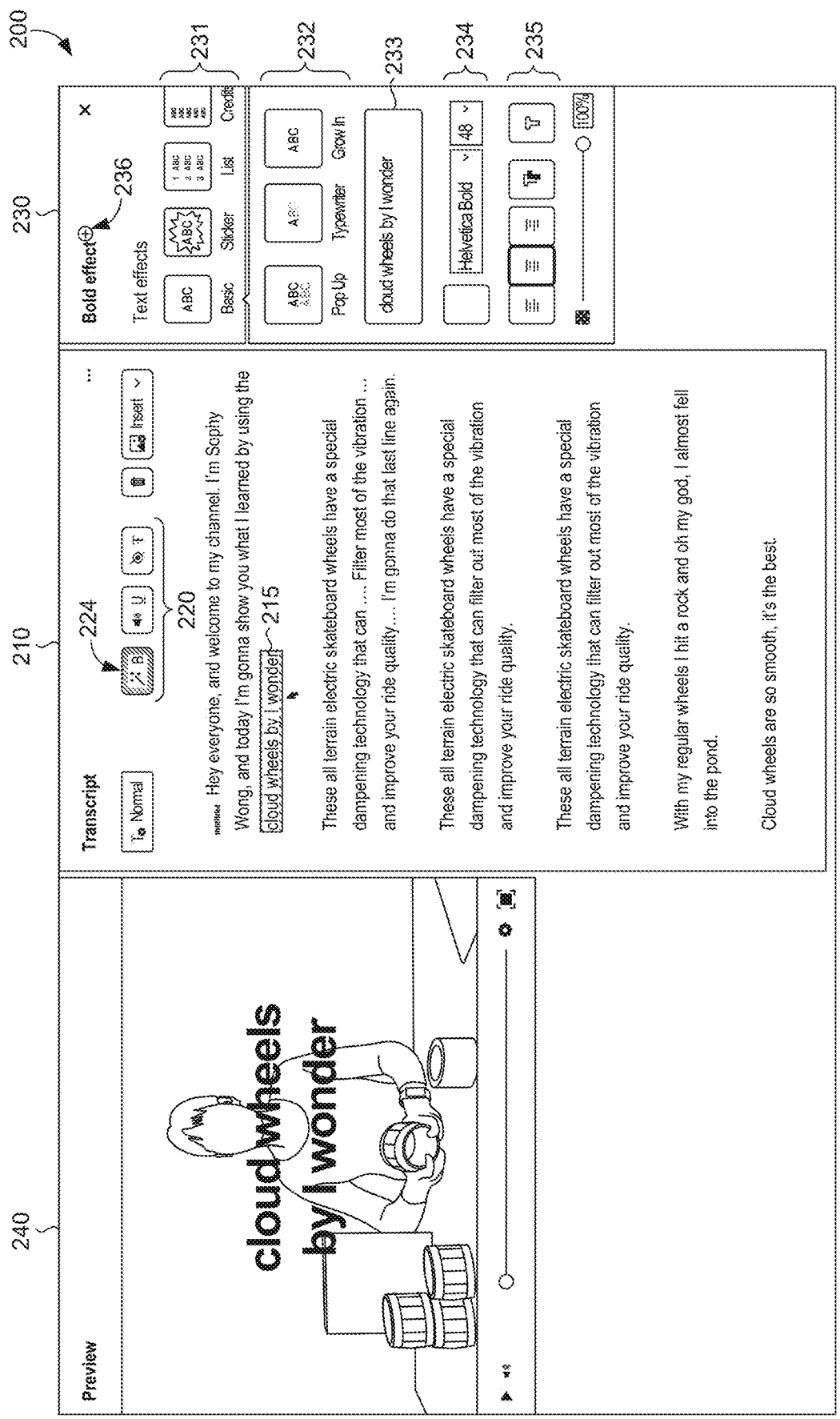
FIG. 2 illustrates an example video editing interface providing text-based editing, in accordance with embodiments of the present disclosure.

FIG. 2 illustrates an example video editing interface 200, in accordance with embodiments of the present disclosure. The video editing interface 200 includes a transcript interface 210, a text stylization panel 220, a video effects panel 230, and a playback region 240. The transcript interface 210 presents a visualization of a loaded video's transcript, the text stylization panel 220 presents various stylization options that can be applied to text segments in the transcript, and the playback region 240 plays back a loaded video and displays applied effects. In an example implementation, the video editing interface 200 loads a video and presents the video in the playback window 240 with playback controls and also presents a transcript corresponding to the video in the transcript interface 210.

In FIG. 2, the transcript interface 210 presents a portion of a transcript that includes highlighted text segment 215 with an applied text stylization corresponding to a video effect. As illustrated, the highlighted text segment 215 is displayed with an applied bold text stylization. The bold text stylization button 224 is highlighted as an indication that it is selected and applied to the highlighted text segment 215.

In some configurations, the bold text stylization is mapped to a default video effect that is applied to a video segment corresponding to the text segment 215. In some configurations, the mapping of the bold text stylization to a video effect is configurable by the user. For instance, as shown in the example of FIG. 2, upon selection of the bold text stylization button 224, the video effects panel 230 provides and displays corresponding video effect options associated with and mapped to the bold text stylization. In this instance, the video effect options are text effect options for a video effect that overlays text on the video. The text effect options in this example include a text appearance option 231, a text visual option 232, a text window 233 for providing the text overlay, and text stylization or layout options 234, 235. Additionally, the video effects panel 230 provides an add effect button 236 that provides a mechanism for adding multiple video effects to a video segment and associating those video effects with an applied text stylization (e.g., bold text stylization). For example, when the add effect button 236 is pressed, a second text overlay visualization is applicable such that the first "cloud wheel by I wonder" is displayed with another text overlay as the selected text segment is spoken in the video.

As illustrated, the text "cloud wheel by I wonder" appears as an overlay in the video when the text segment 215 is spoken in the video. In some implementations, the text effect options selected in the video effects panel 230 are applied to the text as it is presented on the video to provide additional video effect visualizations to the text overlay. It should be noted that the text effect options 231, 232, 233, 234, and 235 are for exemplary purposes only, and that other video effect options are also visualizable and providable.

Depending on the embodiment, the text stylization panel 220 provides various text stylizations, formats, and/or layout commands that are mappable to a particular video effect and/or video effect type. For instance, in this illustration, the text stylization panel 220 includes the text bolding stylization button 224 mapped to a visual effect type, an underline button mapped to an audio effect type, and a strikethrough stylization button mapped to a video masking effect type.

Figure 3:
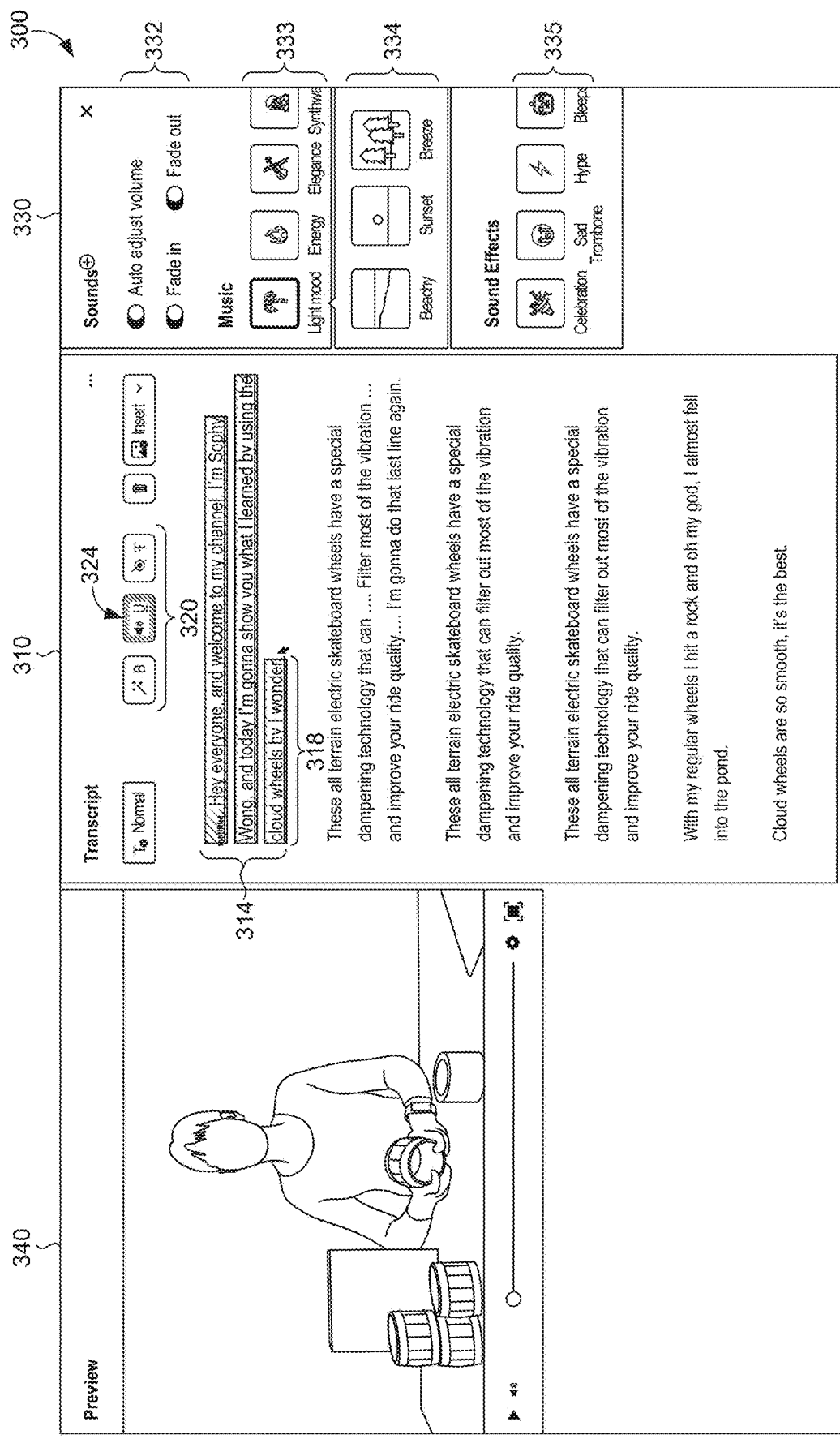
FIG. 3 illustrates an example video editing interface providing text-based editing, in accordance with embodiments of the present disclosure.

FIG. 3 illustrates an example video editing interface 300, in accordance with embodiments of the present disclosure. As shown, the video editing interface 300 is a continuation of a video editing process as described in FIG. 2. The video editing interface 300 includes a transcript interface 310, a text stylization panel 320, a video effects panel 330, and a playback region 340. The transcript interface 310 presents a visualization of a loaded video's transcript, the text stylization panel 320 provides various stylization options that are applicable to text segments in the transcript, and the playback region 340 plays back a loaded video and displays the applied effects. In an example implementation, the video editing interface 300 loads a video and presents the video in the playback window 340 with playback controls and also presents a transcript corresponding to the video in the transcript interface 310.

In FIG. 3, the transcript interface 310 presents a portion of a transcript that includes highlighted text segment 314 (e.g., selected text segment) with an applied text stylization or layout (corresponding to a text stylization button 324) that is mapped to a video effect (e.g., a default video effect or a video effect selected from the video effects panel 330). Upon selection of the text stylization button 324, the video effects panel 330 provides and displays corresponding video effect options associated with and mapped to the underline text stylization. In this instance, the video effect options are audio effect options for an audio track that plays concurrently with the audio track associated with the video. The audio effect options in this example include an audio effect option 332 providing various audio adjustments, an audio type option 333 providing different music types, an audio scenery option 334 providing a refined music type based on a selection of an audio type option 333, and additional audio effects 335 that are also playable.

In this instance, the text stylization or layout is an underline text stylization mapped to audio effects. Accordingly, the highlighted text segment 314 is visualized with an underlined text stylization. The text stylization button 324 is shown with an underlined 'U' as is commonly used in text editing to represent the underlining stylization and an audio speaker represents the associated audio effects mapped to the underlined text stylization.

Within the highlighted text segment 314, another text segment 318 includes an additional text stylization or layout (e.g., boldface). The additional text stylization or layout indicates that at least one other video effect is applied to the text segment 318. During playback of the video, when the text segment 318 is spoken, the underlined text stylization indicates that the selected audio effect is playing, and the boldface text stylization indicates that another effect is also playing. For example, referring back to FIG. 2, the boldface text stylization is mapped to a video effect that provides a text overlay on the video when the text segment is spoken. As such, when the text segment 318 is spoken, the text overlay appears with the corresponding audio of the video, for instance, as selected from the video effects panel 330.

Figure 4:
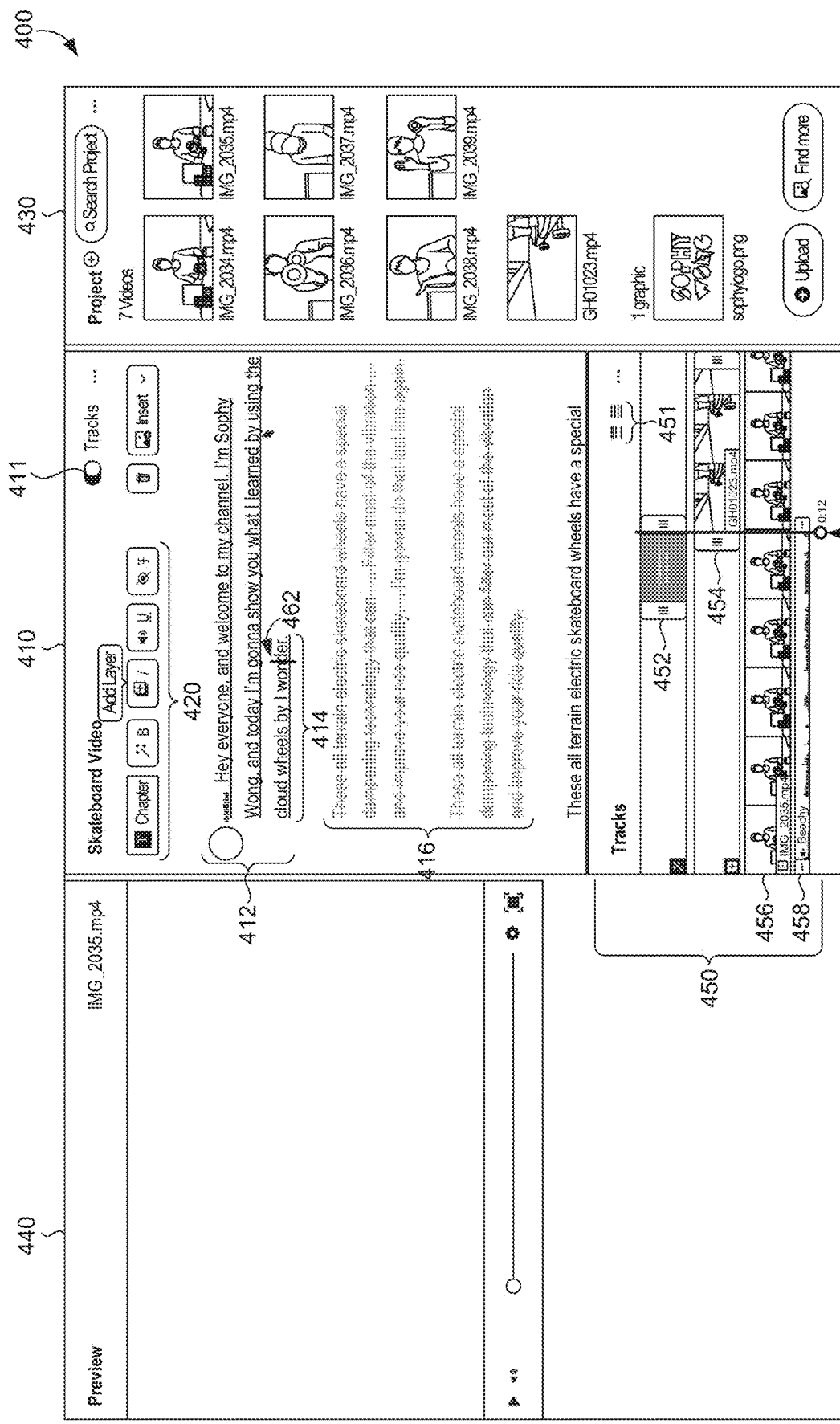
FIG. 4 illustrates an example video editing interface providing text-based editing with a tracks panel, in accordance with embodiments of the present disclosure.

FIG. 4 illustrates an example video editing interface 400, in accordance with embodiments of the present disclosure. As shown, the video editing interface 400 is a continuation of a video editing process as described in FIGS. 2 and 3. The video editing interface 400 includes a transcript interface 410, a text stylization panel 420, a video effects panel 430, a playback region 440, and a tracks panel 450. The transcript interface 410 presents a visualization of a loaded video's transcript, the text stylization panel 420 provides various stylization options that are applicable to text segments in the transcript, the playback region 440 plays back a loaded video and displays applied effects, and the tracks panel 450 provides a text overlay track 452, a hidden video track 454, a video track 456, and an audio effect track 458. As shown, the video effects panel 430 provides and displays sample video segments and graphics that are addable to the project video. In an example implementation, the video editing interface 400 loads a video and presents the video in the playback window 440 with playback controls and also presents a transcript corresponding to the video in the transcript interface 410 with a tracks panel 450 enabled.

In FIG. 4, the transcript interface 410 presents a portion of a transcript that includes stylized text segments 412, 414, and 416 corresponding to an applied video effect associated with a particular text stylization or layout. As illustrated, the stylized text segment 412 includes an underline text stylization associated with audio effects, the stylized text segment 414 includes a bold text stylization associated with visual effects, and the stylized text segment 416 includes a strikethrough text stylization associated with hiding portions of a video when the strikethrough text segment is spoken. More particularly regarding the strikethrough text stylization, in some configurations, when a strikethrough text stylization is applied to a text segment, a video segment corresponding to that text segment is not presented during video playback.

In this instance, the tracks toggle button 411 is enabled to enable visualization of the tracks panel 450. In some implementations, the tracks panel 450 includes viewing options 451. The viewing options include a compact track view that, when enabled, displays the video track 456 with all applied video effects and an expanded track view that, when enabled, displays the video track 456, and a track for each applied video effect. In this instance, the tracks panel 450 has the expanded viewing option enabled and is displaying the text overlay track 452, the hidden video track 454, the video track 456, and the audio effect track 458.

In some implementations, the expanded tracks in the tracks panel include adjustable handles on each end of each track, allowing mechanisms to adjust and trim the corresponding video effect by selecting (e.g., by clicking or tapping and dragging along the effect track) the selected handle and adjusting the placement of the video effect as represented by the effect track. As shown, the video effect tracks 452, 454, and 458 have adjustable handles to allow for individual adjustments to be made to the video effects via the tracks panel 450.

In the current implementation, as shown in FIG. 4, the tracks panel 450 includes a current time indicator 460 displayed over the tracks 452, 454, 456, and 458 to indicate the current time of a video during playback. As such, the current time indicator 460 indicates when a video effect is played in relation to the project video and where in the video it is played. In this implementation, the current time indicator 460 in the tracks panel 450 is associated with a cursor caret 462 in the transcript interface 410. The position of the cursor caret 465 corresponds to the time when a video is being played in regard to the words in the transcript as displayed in the transcript interface 410. As shown, the cursor caret 462 is positioned within the word "wonder" as that word is being spoken in the video. The current time indicator 460 provides a corresponding indication marker along the tracks to indicate where the word "wonder" is spoken. These coordinated visualizations provide users with additional precision when making edits to the video effects in either the transcript interface 410 and/or the tracks panel 450.

Example Flow Diagrams

Figure 5:
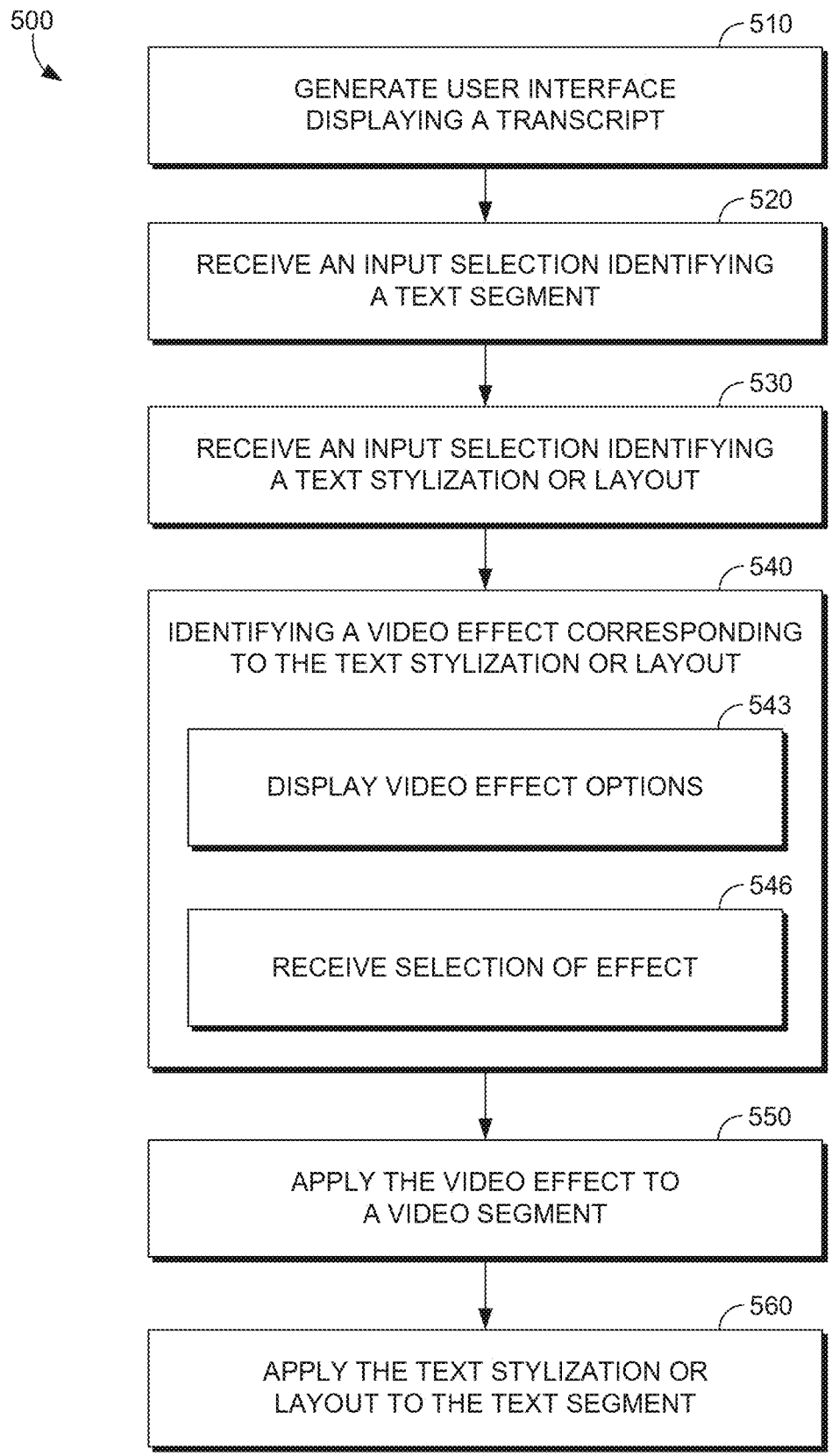
FIG. 5 is a flow diagram showing a method for applying video effects to a video via a transcript, in accordance with embodiments of the present disclosure.
Figure 6:
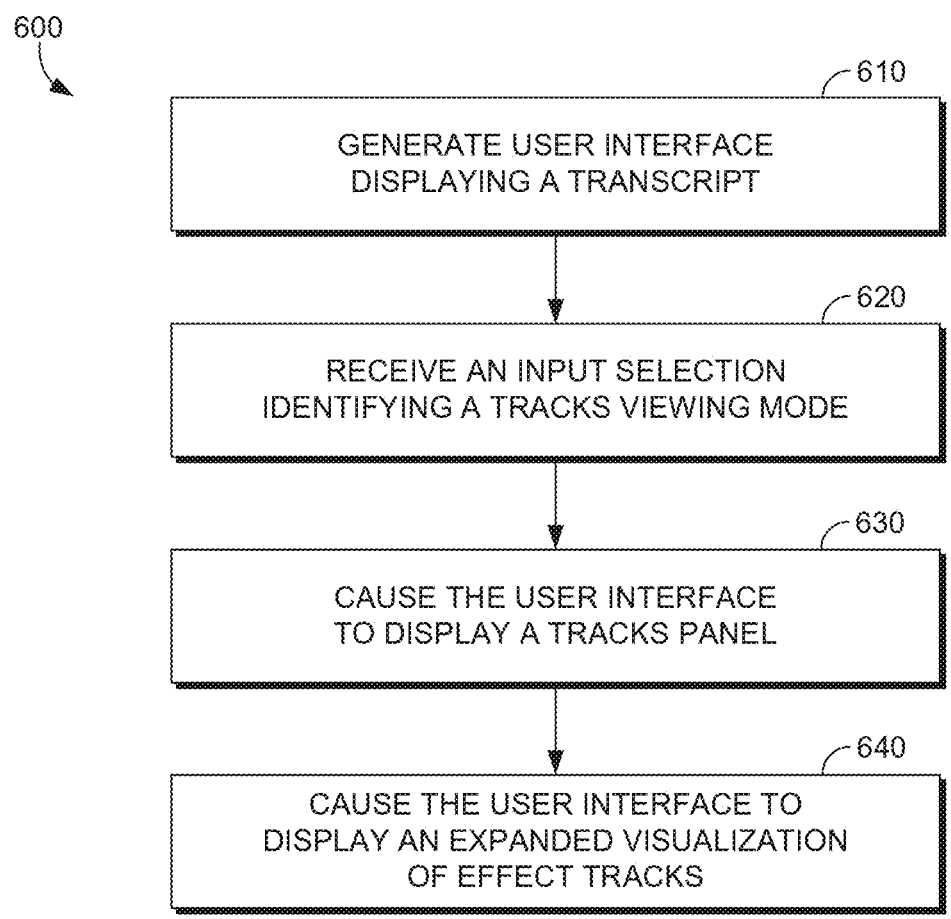
FIG. 6 is a flow diagram showing a method for providing a tracks viewing mode of applied video effects on a text line of a transcript, in accordance with embodiments of the present disclosure.

With reference now to FIGS. 5-6, flow diagrams are provided illustrating methods for applying video effects to a video via a transcript and providing visualizations and interaction modalities through text stylizations or layouts. Each block of the methods 500 and 600 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 5 is a flow diagram showing a method 500 for applying video effects to a video via a corresponding transcript, in accordance with embodiments of the present disclosure. Initially, at block 510, a video editing application generates a user interface (e.g., transcript interface) displaying a transcript of an audio track of a video. In some embodiments, the transcript is produced during video ingestion, where the transcript is extracted from an audio track of the video (e.g., using known techniques) to identify sentences, words, and timecodes representing when each word is spoken in the video.

At block 520, the user interface receives an input selection identifying a text segment from the transcript. For example, a user clicks and drag across words on the transcript to select a text segment. The identified boundaries corresponding to the selected text segment are used as boundaries for a selected video segment. At block 530, the user interface receives an input selection identifying a particular type of text stylization or layout (e.g., bold, italics, underline, strikethrough, indent, heading) with an associated (e.g., mapping) video effect type (e.g., visual effect, audio effect) to be applied to the video segment corresponding to the selected text segment.

At block 540, the text-based video editing tool identifies a video effect corresponding to the particular text stylization or layout. In some embodiments, the identification between the video effect and the particular text stylization or layout occurs using a mapping. The mapping is an indicator as to what video effect is associated with a particular text stylization or layout. For example, in some configurations, a bold text stylization is mapped to a text overlay video effect to cause a text overlay video effect to be applied.

Some embodiments employ a default mapping between text stylizations or layouts and video effects. In some embodiments, the mapping between text stylizations or layouts and video effect types is user-configurable. For example, a user selects a particular text stylization (e.g., bold, italic, underline, strikethrough, etc.) and a particular video effect type (e.g., visual effects, audio effects, etc.) and/or video effect and utilizes the configurable mapping to map the selected text stylization or layout to the selection video effect type/video effect.

In some embodiments, the user interface, via an effect panel, and in response to receiving input identifying selection of the text stylization or layout, displays video effect options associated with the video effect type. This is illustrated at block 543. In an example implementation, a visual effect type includes video effect options such as overlays, graphics, blurring effects, added text, and the like. At block 546, the user interface receives an input selection identifying a video effect from the video effect options on display by the user interface.

In response to identifying the video effect, the video effect is applied to the video segment corresponding to the selected text segment, as shown at block 550. At block 560, the application of the video effect causes the user interface to display the text stylization or layout on the selected text segment in the transcript. The text stylization or layout represents the selected video effect and provides a visualization on the transcript as to the location and effect type of the applied video effect.

FIG. 6 is a flow diagram showing a method 600 for providing enhanced visualization and a tracks viewing mode when performing video edits using transcript interactions when text stylizations or layouts are applied to text segments, in accordance with embodiments of the present disclosure. Initially, at block 610, a video editing application generates a user interface (e.g., transcript interface) displaying a transcript of an audio track of a video. The transcript includes at least one applied video effect represented on the transcript with a text stylization or layout applied on a text segment.

At block 620, the user interface receives an input selection identifying a tracks viewing mode (e.g., track toggle button) displaying tracks visualizing the video and applied video effects. For example, a user clicks a pointer on a tracks toggle in the transcript to initiate the tracks viewing mode. In response to receiving the input selection identifying the tracks viewing mode, at block 630, the selection causes the user interface to display a tracks panel, including a video track corresponding to the project video.

At block 640, the user interface is caused to display an expanded viewing mode of the track panel. The expanded viewing mode of the tracks panel provides tracks for each applied video effect associated with the project video. For example, suppose the project video has two visual effects and an audio effect. In that case, the expanded view displays a video effect track for each visual effect and another video effect track for the audio effect resulting in three video effect tracks and the primary video track. In some embodiments, the video panel includes adjustable handles on each video effect track. The adjustable handles are dragged across the tracks panel to adjust the duration of the corresponding video effect. During adjustment, the adjusted video effect track in relation to the video track provides users with an enhanced visualization and adjustment mechanic for the video effect while remaining within the tracks panel interface.

Example Computing Environment

Having described an overview of embodiments of the present invention, an example operating environment in which some embodiments of the present invention are implemented is described below in order to provide a general context for various aspects of the present invention. Referring now to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including handheld devices, consumer electronics, general-purpose computers, more specialty computing devices, etc. Some implementations are practiced in distributed computing environments where tasks are performed by remote-processing devices that are linked through a communications network.

Figure 7:
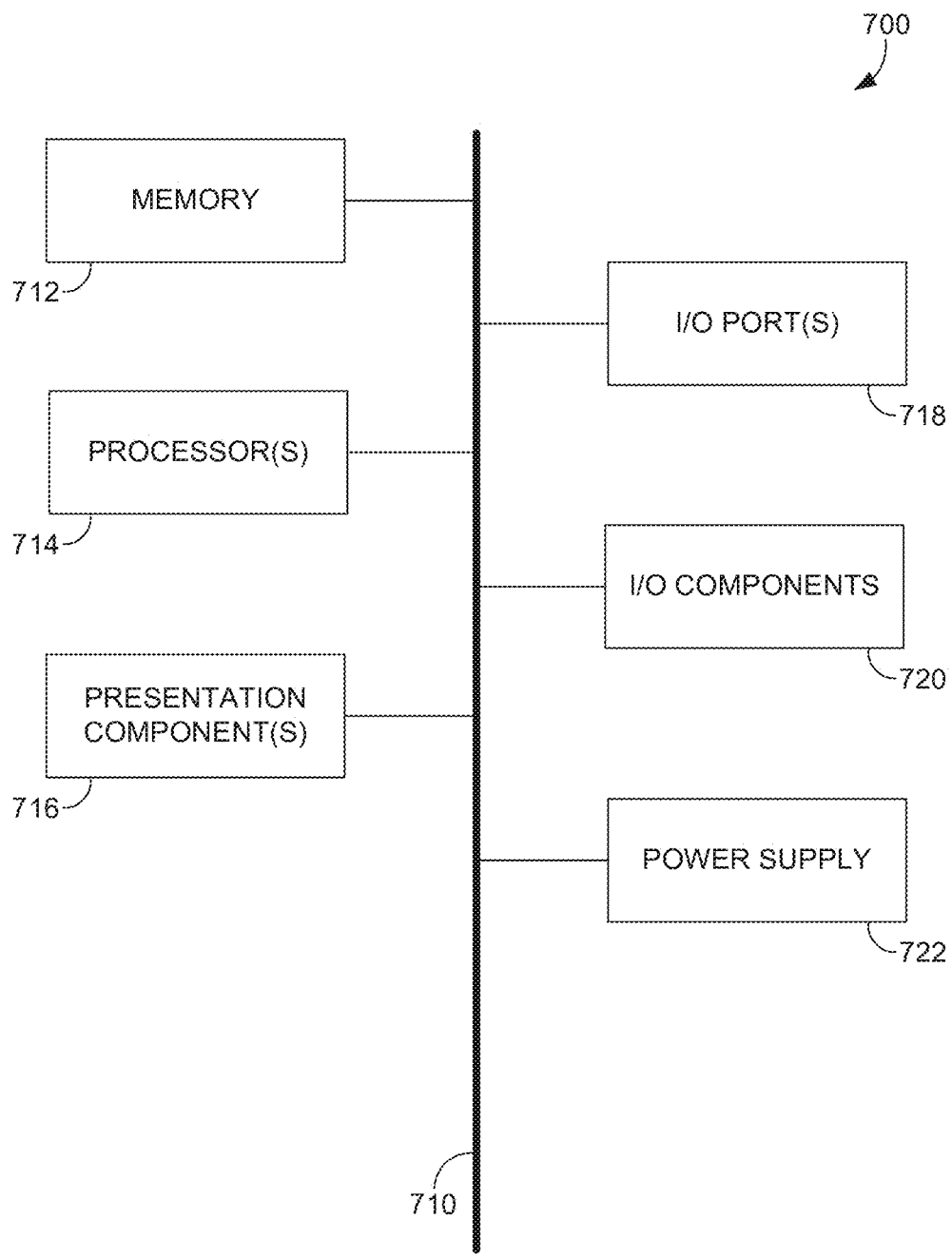
FIG. 7 is a block diagram of an example computing environment suitable for use in implementing embodiments of the present disclosure.

With reference to the example operating environment illustrated in FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in some cases, it is not possible to delineate clear boundaries for different components. In this case, metaphorically, the lines would be grey and fuzzy. As such, the diagram of FIG. 7 and other components described herein should be understood as merely illustrative of various example implementations, such as an example computing device implementing an embodiment or a portion thereof. Distinction is not made between such categories as "workstation," "server," "laptop," "handheld device," etc., as all are contemplated within the scope of FIG. 7 and a "computing device."

Computing device 700 typically includes a variety of computer-readable media. Computer-readable media can be any available media that can be accessed by computing device 700 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 700. In some cases, computing device 700 is equipped with depth cameras, such as stereoscopic camera systems, infrared camera systems, RGB camera systems, touchscreen technology, and combinations of these, for gesture detection and recognition. Additionally or alternatively, the computing device 700 is equipped with accelerometers or gyroscopes that enable detection of motion, and in some cases, an output of the accelerometers or gyroscopes is provided to the display of computing device 700 to render immersive augmented reality or virtual reality.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, cause the one or more computing devices to perform operations comprising:
   generating a user interface (UI) displaying a transcript of an audio track of a video;
   receiving, via the UI, input identifying selection of a text segment from the transcript; and
   in response to receiving, via the UI, input identifying selection of a particular type of text stylization or layout for application to the text segment:
   identifying a video effect corresponding to the particular type of text stylization or layout, wherein the video effect is mapped to the particular type of text stylization or layout based on a configurable mapping;
   in response to identifying the video effect, displaying, via the UI, video effect options;
   receiving, via the UI, input identifying selection of the video effect from the video effect options;
   applying the video effect to a video segment corresponding to the text segment; and
   applying the particular type of text stylization or layout to the text segment to visually represent the video effect in the transcript.

2. The one or more computer storage media of claim 1, the operations further comprising:
  in response to receiving, via the UI, input identifying selection of a second type of text stylization or layout for application to the text segment:
  identifying a second video effect corresponding to the second type of text stylization or layout;
  applying the second video effect to the video segment corresponding to the text segment; and
  applying the second type of text stylization or layout to the text segment to visually represent the second video effect in the transcript.

3. The one or more computer storage media of claim 1, where identifying the video effect comprises:
  displaying, via the UI, video effect options; and
  receiving, via the UI, input identifying selection of the video effect from the video effect options.

4. The one or more computer storage media of claim 1, the operations further comprising:
  in response to receiving, via the UI, selection of a track visualization representing the video segment:
  displaying, via the UI, a video track of the video segment and an effects track of the video effect.

5. The one or more computer storage media of claim 4, the operations further comprising:
  receiving, via the UI, selection of an adjustment of a current time indicator associated with the video track; and
  displaying, via the UI, a cursor caret within the transcript at a current time as indicated by the current time indicator in the video track.

6. The one or more computer storage media of claim 4, wherein the video track includes adjustable handles for trimming the video effect.

7. The one or more computer storage media of claim 1, the operations further comprising:
  upon detection of a video effect type corresponding to the particular type of text stylization or layout, displaying a video effects panel with selectable video effects associated with the video effect type.

8. The one or more computer storage media of claim 1, wherein the configurable mapping is generated by a user.

9. A method comprising:
  generating a user interface (UI) displaying a transcript of an audio track of a video; and
  in response to receiving, via the UI, selection of a particular type of text stylization or layout for application to a text segment of the transcript:
  identifying a video effect corresponding to the particular type of text stylization or layout;
  in response to identifying the video effect, displaying, via the UI, video effect options;
  receiving, via the UI, input identifying selection of the video effect from the video effect options;
  applying the video effect to a video segment corresponding to the text segment; and
  applying the particular type of text stylization or layout to the text segment to visually represent the video effect in the transcript.

10. The method of claim 9, wherein the video effect and the particular type of text stylization or layout are associated via a configurable mapping.

11. The method of claim 10, wherein the configurable mapping is generated by a user.

12. The method of claim 9, further comprising:
  in response to receiving, via the UI, input identifying selection of a second type of text stylization or layout for application to the text segment:
  identifying a second video effect corresponding to the second type of text stylization or layout;
  applying the second video effect to the video segment corresponding to the text segment; and
  applying the second type of text stylization or layout to the text segment to visually represent the second video effect in the transcript.

13. The method of claim 9, further comprising:
  in response to receiving, via the UI, selection of a tracks viewing mode representing the video segment:
  displaying, via the UI, a video track of the video segment and a video effect track of the video effect.

14. The method of claim 13, further comprising:
  receiving, via the UI, selection of an adjustment of a current time indicator associated with the video track; and
  displaying, via the UI, a cursor caret within the transcript at a current time as indicated by the current time indicator in the video track.

15. The method of claim 13, wherein the video effect track includes adjustable handles for trimming the video effect.

16. The method of claim 9, further comprising:
  upon detection of a video effect type corresponding to the particular type of text stylization or layout, displaying a video effects panel with selectable video effects associated with the video effect type.

17. A computer system comprising one or more processors and memory configured to provide computer program instructions to the one or more processors, the computer program instructions comprising:
  generating a user interface (UI) displaying a transcript of an audio track of a video;
  receiving, via the UI, input identifying selection of a text segment from the transcript; and
  in response to receiving, via the UI, input identifying selection of a particular type of text stylization or layout for application to the text segment:
  displaying, via the UI, video effect options associated with a video effect type for application to a video segment corresponding to the text segment, wherein the video effect type and the particular type of text stylization or layout are associated via a configurable mapping;
  receiving, via the UI, input identifying selection of a video effect from the video effect options;
  applying the video effect to the video segment corresponding to the text segment; and
  applying the particular type of text stylization or layout to the text segment to visually represent the video effect in the transcript.

18. The computer system of claim 17, the computer program instructions further comprising:
  in response to receiving, via the UI, input identifying selection of a second type of text stylization or layout for application to the text segment:
  identifying a second video effect corresponding to the second type of text stylization or layout;
  applying the second video effect to the video segment corresponding to the text segment; and
  applying the second type of text stylization or layout to the text segment to visually represent the second video effect in the transcript.

19. The computer system of claim 17, the computer program instructions further comprising:
  upon detection of the video effect type, displaying a video effects panel with the video effect options.

20. The computer system of claim 19, wherein the video effect options are associated with the video effect type.

\* \* \* \* \*